(12) United States Patent
Kons et al.

(10) Patent No.: US 12,074,658 B2
(45) Date of Patent: Aug. 27, 2024

(54) CHANNEL QUALITY PREDICTION IN CLOUD BASED RADIO ACCESS NETWORKS

(71) Applicant: Cohere Technologies, Inc., Santa Clara, CA (US)

(72) Inventors: Shachar Kons, Santa Clara, CA (US); Ronny Hadani, Santa Clara, CA (US)

(73) Assignee: Cohere Technologies, Inc., San Jose, CA (US)

( * ) Notice: Subject to any disclaimer, the term of this patent is extended or adjusted under 35 U.S.C. 154(b) by 201 days.

(21) Appl. No.: 17/760,086

(22) PCT Filed: Jan. 27, 2021

(86) PCT No.: PCT/US2021/015251
§ 371 (c)(1),
(2) Date: Aug. 3, 2022

(87) PCT Pub. No.: WO2021/158403
PCT Pub. Date: Aug. 12, 2021

(65) Prior Publication Data
US 2023/0044134 A1 Feb. 9, 2023

Related U.S. Application Data

(60) Provisional application No. 62/970,848, filed on Feb. 6, 2020.

(51) Int. Cl.
*H04B 17/373* (2015.01)
*H04L 25/02* (2006.01)

(52) U.S. Cl.
CPC ....... *H04B 17/373* (2015.01); *H04L 25/0222* (2013.01); *H04L 25/023* (2013.01)

(58) Field of Classification Search
CPC .. H04B 17/373; H04L 25/0222; H04L 25/023
See application file for complete search history.

(56) References Cited

U.S. PATENT DOCUMENTS

| 2005/0118955 A1 | 6/2005 | Denk et al. |
| 2007/0032196 A1 | 2/2007 | Dominque et al. |
| 2012/0300661 A1 | 11/2012 | Asplund et al. |
| 2014/0241314 A1 | 8/2014 | Raleigh et al. |

FOREIGN PATENT DOCUMENTS

| WO | 2013/034202 | 3/2013 |
| WO | 2013/056435 | 4/2013 |
| WO | 2019/029802 | 2/2019 |
| WO | 2019/089986 | 5/2019 |

OTHER PUBLICATIONS

International Search Report and Written Opinion for PCT/US2021/15251, dated Apr. 6, 2021, 20 pages.
Extended European Search Report for Co-Pending EP application, dated Feb. 2, 2024, 9 pages.

*Primary Examiner* — Natasha W Cosme
(74) *Attorney, Agent, or Firm* — Perkins Coie LLP

(57) ABSTRACT

Methods, apparatus and systems for wireless communication are described. One example method includes estimating, based on channel quality information for a first communication channel during a first time interval, a predicted quality of a second communication channel during a second time interval that is a latency interval after the first time interval and using the predicted quality for processing transmissions on the second communication channel during the second time interval.

20 Claims, 9 Drawing Sheets

CHANNEL QUALITY PREDICTION IN CLOUD BASED RADIO ACCESS NETWORKS

CROSS-REFERENCE TO RELATED APPLICATION

This patent document is a 371 National Phase Application of PCT Application No. PCT/US2021/015251 entitled "CHANNEL QUALITY PREDICTION IN CLOUD BASED RADIO ACCESS NETWORKS" filed on Jan. 27, 2021, which claims priority to U.S. Provisional Application No. 62/970,848, filed on Feb. 6, 2020, entitled "CHANNEL QUALITY PREDICTION IN CLOUD BASED RADIO ACCESS NETWORKS", the disclosure of which is hereby incorporated by reference herein in its entirety.

TECHNICAL FIELD

The present document relates to wireless communication.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks. Many of those activities involve situations in which a large number of user devices may be served by a network.

SUMMARY

This document discloses techniques that may be embodied in wireless network devices that operate in a cloud-based radio access network (C-RAN).

In one example aspect a wireless communication method is disclosed. The method includes estimating, based on channel quality information for a first communication channel during a first time interval, a predicted quality of a second communication channel during a second time interval that is a latency interval after the first time interval and using the predicted quality for processing transmissions on the second communication channel during the second time interval.

In another example aspect, a wireless communication apparatus comprising processor electronics and transceiver electronics is disclosed. The transceiver electronics is configured to receive channel quality information for a first communication channel during a first time interval. The processor electronics is configured to estimate a predicted quality of a second communication channel during a second time interval that is a latency time interval after the first time interval and using the predicted quality for processing transmissions on the second communication channel during the second time interval.

In yet another example aspect, a method implemented by a remote network device is disclosed. The method includes receiving, from one or more local network devices, channel quality information in first time periods for a first communication channel to or from each of the local network devices and providing, information to the one or more local network devices for processing future transmissions on a second communication channel to or from the one or more local network devices during second time periods, wherein the first time periods and the second time periods are separated by latency periods between corresponding local network devices and the remote network device.

In yet another example aspect, a wireless communication apparatus that implements the above-described method is disclosed.

In yet another example aspect, the methods may be embodied as processor-executable code and may be stored on a computer-readable program medium.

These, and other, features are described in this document.

DESCRIPTION OF THE DRAWINGS

Drawings described herein are used to provide a further understanding and constitute a part of this application. Example embodiments and illustrations thereof are used to explain the technology rather than limiting its scope.

DETAILED DESCRIPTION

To make the purposes, technical solutions and advantages of this disclosure more apparent, various embodiments are described in detail below with reference to the drawings. Unless otherwise noted, embodiments and features in embodiments of the present document may be combined with each other. Section headings are used in the present document for ease of understanding and do not limit scope of the embodiments and techniques described in a section only to that section.

Initial Discussion

A base-station in a wireless Radio Access Network (RAN), such as Third Generation Partnership Project, 3GPP's Long Term Evolution LTE or 5G, is typically located within the cell's area and locally controlling the downlink and uplink transmissions. In recent years, there has been more motivation to move parts of the base-station to a remote central location (also known as the "cloud"), for different reasons such as shared computing power, coordinated transmissions, easier maintenance, etc. However, the main drawback of this approach, is the introduced latency of transferring information back and forth from the remote central location to the local part of the base-station within the cell.

Figure 1A:
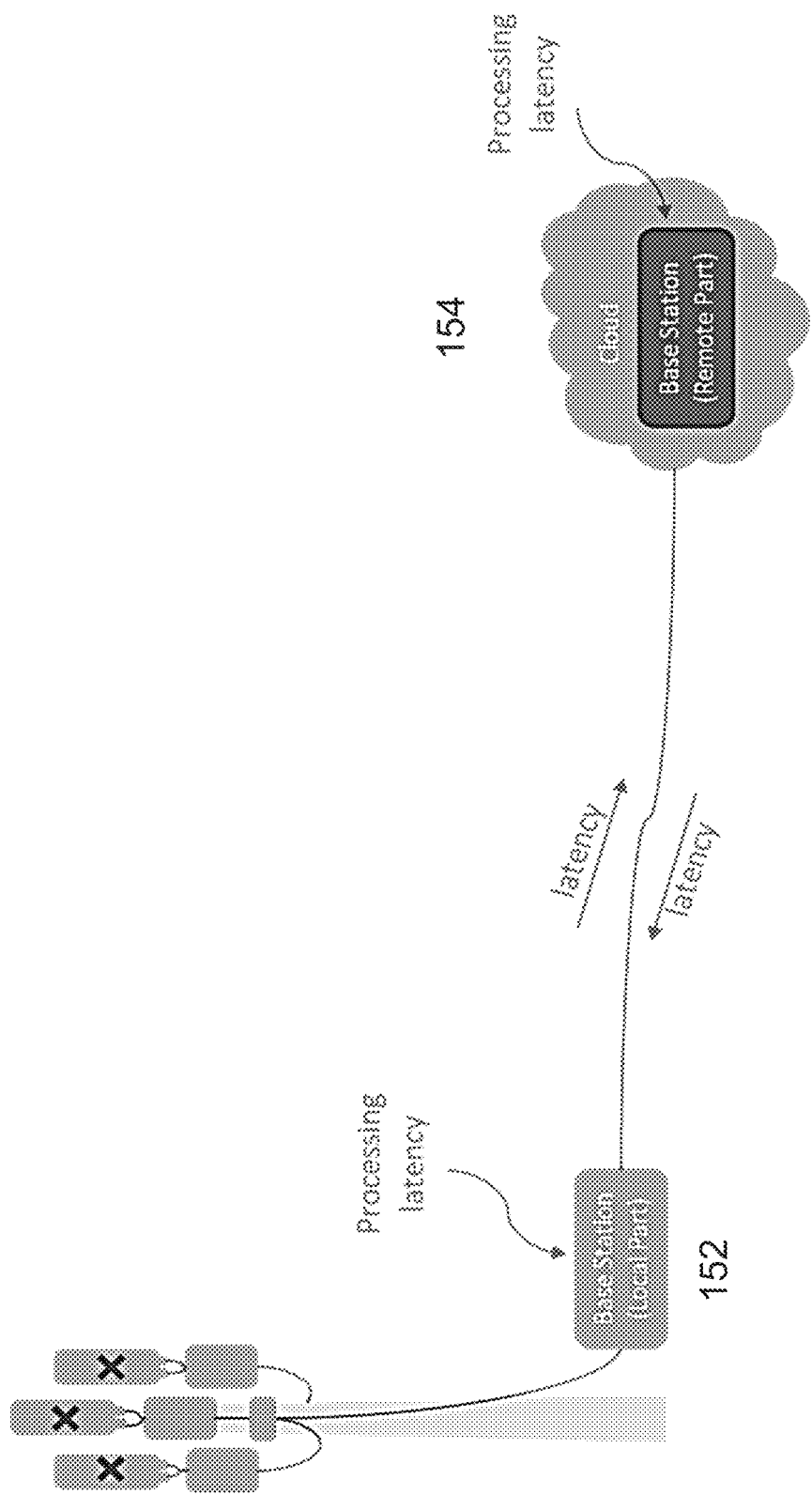
FIG. 1A shows an example of a radio access network (RAN).

FIG. 1A shows an example of such a system. In the depicted configuration, base station functionality is implemented partly locally (152) and partly in the remote cloud (154). The total latency is introduced by processing in the local and remote parts and by the communication back and forth from the remote location.

The time and frequency response of wireless channels changes with mobility (of user devices and/or reflectors) and decisions made by the base-station, such as on which sub-band to transmit for a specific user, or which modulation and coding rate to use, may age quickly and not be relevant anymore after a certain latency period. This is one of the main reasons why, cloud-based RAN (C-RAN) are still not widely deployed.

This document describes a novel approach how to predict the Signal to Interference and Noise Ratio (SINR) or equivalently the channel quality after a certain latency period, thus providing means for a C-RAN, to better select parameters for transmissions, even after a latency period. The latency period may be, for example, of the order of several transmission time intervals (TTI) in an LTE or 5G system.

The disclosed techniques are used by embodiments for predicting channel quality for future behavior of communication channels may be implemented in various wireless communication systems, some of which are described with reference to FIGS. 1B, 2, 3, and 4. In particular, various techniques for the predictive computations are disclosed. These techniques allow for a prediction of channel behavior at a future time and/or a different frequency with an operationally acceptable accuracy to maintain a target quality of communication between wireless devices (sometimes called user equipment or UE) and network-side devices such as base stations (e.g., eNodeB or gNodeB).

Example Wireless Systems

Figure 1B:
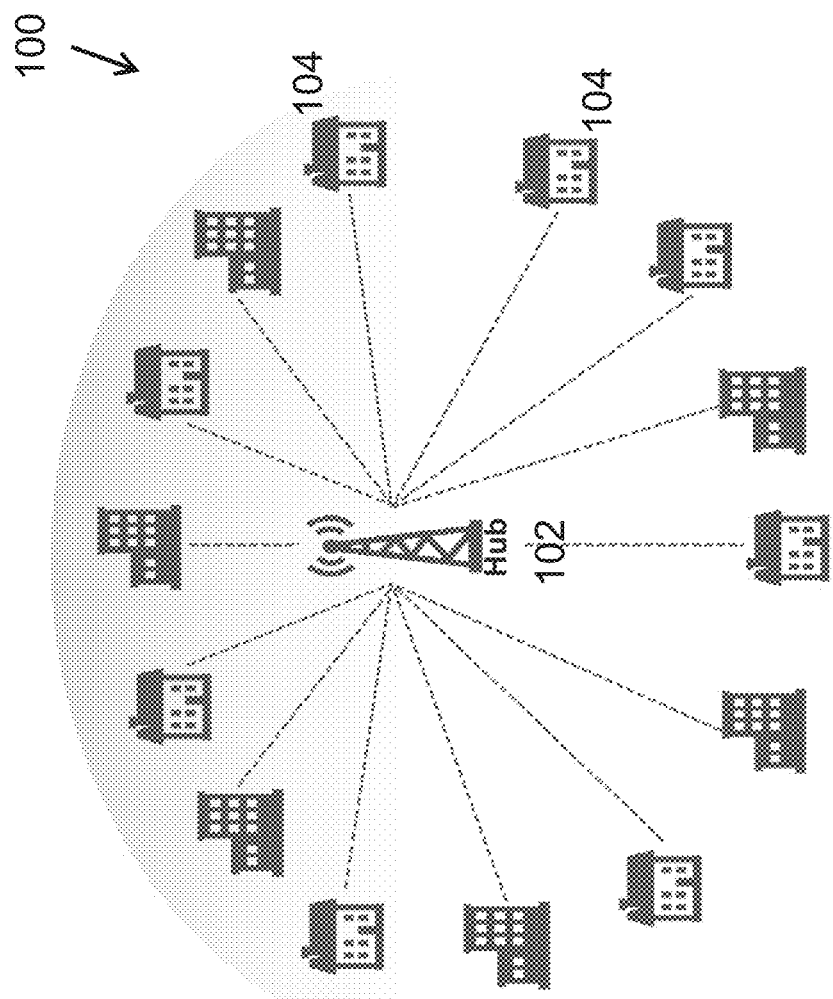
FIG. 1B shows an example of a fixed wireless access network.

FIG. 1B shows an example of a fixed wireless access system 100. A hub 102, that includes a transmission facility such as a cell tower, is configured to send and receive transmissions to/from multiple locations 104 (only two of which have been shown with the reference numeral for simplicity). For example, the locations could be user premises or business buildings. In some cases, the locations 104 may be transmission towers of respective cells that are controlled by a centralized cloud-based computational facility such as described in the present document, represented as hub 102 in FIG. 1B). As described throughout this document, the disclosed embodiments can achieve very high cell capacity fixed wireless access, when compared to traditional fixed access technology. Some techniques disclosed herein can be embodied in implementations at the hub 102 or at transceiver apparatus located at the locations 104.

Figure 2:
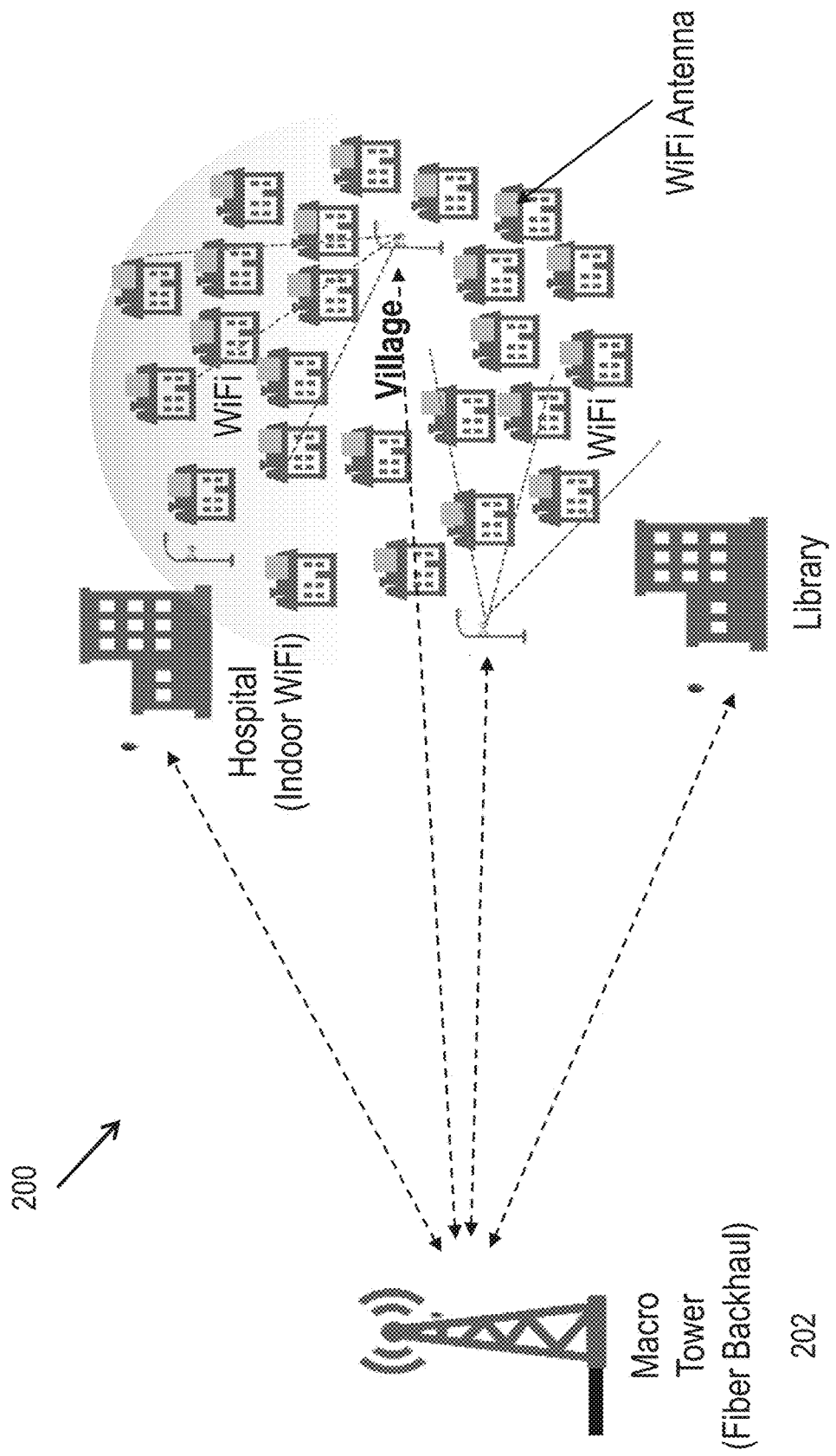
FIG. 2 shows another example of a fixed wireless access network.

FIG. 2 shows yet another configuration of a fixed access wireless communication system 200 in which hops are used to reach users. For example, one cell tower may transmit/receive from another cell tower, which would then relay the transmissions between the principle cell tower and the users, thus extending range of the fixed wireless access system. A backhaul may connect the transmission tower 202 with an aggregation router. For example, in one configuration, a 10 Gbps fiber connection may be used to feed data between a base station at a hub and a fiber hub aggregation router. In one advantageous aspect, deployment of this technology can be achieved without having to change any network bandwidth characteristics for harder to reach areas by using the hub/home access point (AP) configuration as a launch point. Some techniques disclosed herein can be embodied in implementations at the macro tower 202 or at transceiver apparatus located at the other locations. Furthermore, the disclosed techniques may be implemented for wireless communication among various macro towers that use wireless backhaul connections in place of, or in addition to, the fiber backhaul.

Figure 3:
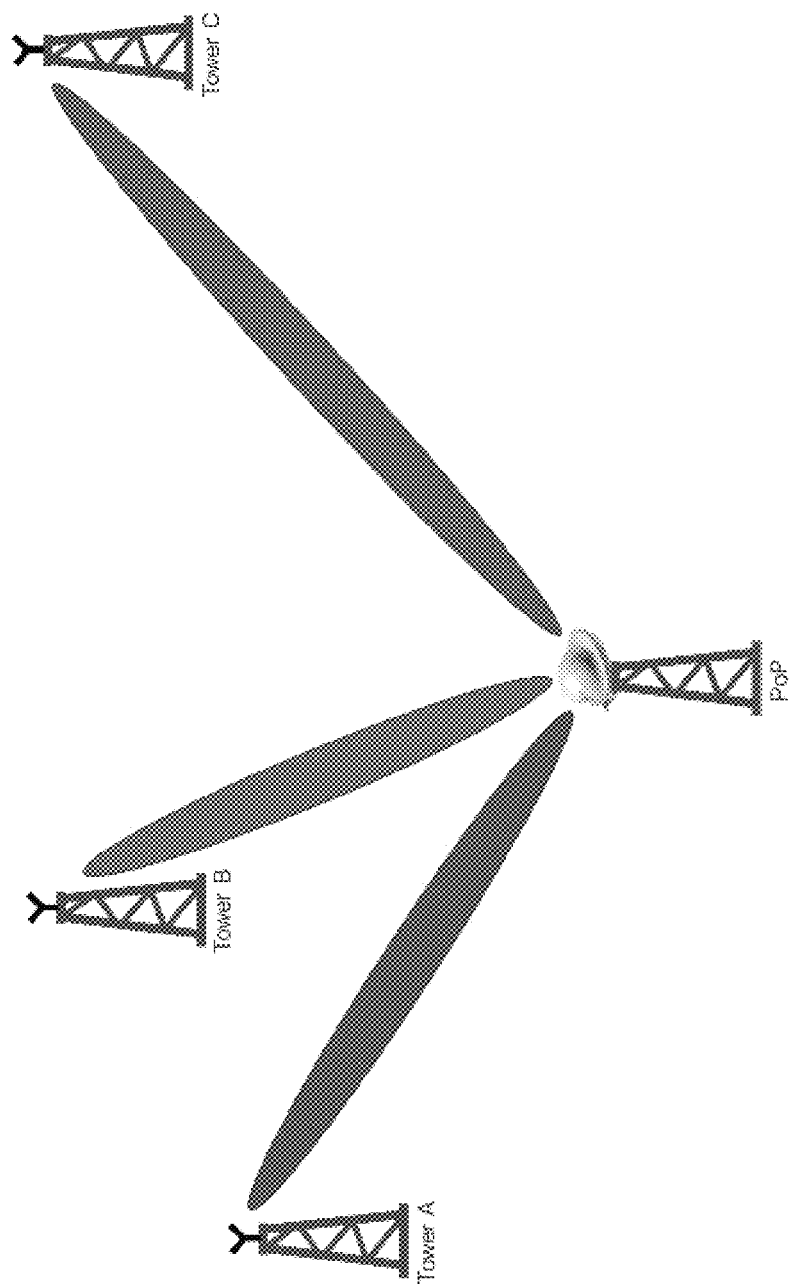
FIG. 3 shows an example of a cellular backhaul network.

For stationary devices, the beams may be set at fixed directions, pointing to the devices. An example of such a system, is a cellular backhaul, where a hub, connected to a fiber feed, is communicating with remote towers (which have no fiber connection). FIG. 3 illustrates such an example.

FIG. 3 shows a cellular backhaul example. A hub, denoted as a PoP (Point of Presence), is connected to a fiber (not explicitly shown) and communicates with remote towers using a Luneburg antenna and three different beams pointing towards these towers. If the Luneburg has dual-polarization input feeds and the remote antennas are dual-polarized as well, a two-layer link may be established between the hub and each tower.

Figure 4:
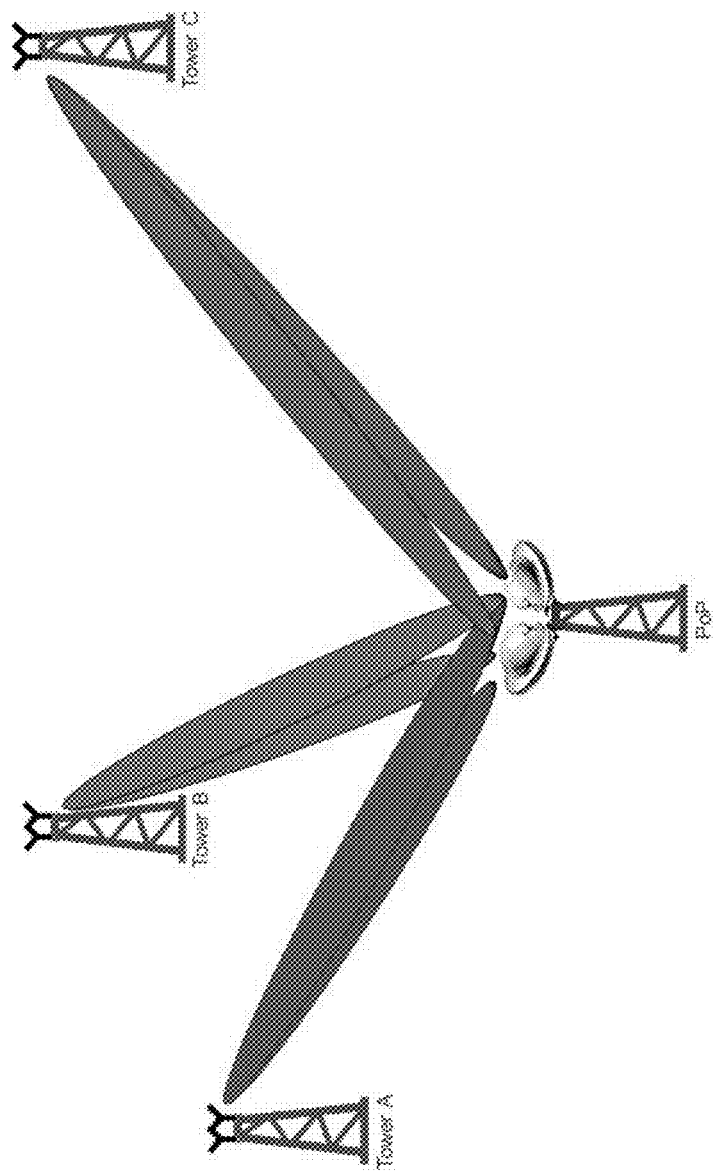
FIG. 4 shows an example of a multiple hub antenna configuration.

Dual polarization antennas and multiple antennas at the remote devices and the hub may all be used to create a multi-layer link between the hub and the devices. Note, that multiple antennas should be spatially separated for a good quality multi-layer link. FIG. 4 illustrates an example of such a system.

The above described systems include a base station functionality that may be implemented using the local function and remote function as described in the present document. For example, the hub 102, or the macro tower 202 may use the techniques described herein. Furthermore, various towers depicted in FIGS. 3-4 may implement a local part of the base station and the PoP may implement a remote part, with the PoP responsible for the remote calculations as described herein. Furthermore, the beams depicted in FIGS. 3-4 represent communication channels used for communication between the remote and local parts of the base station, with transmission/reception using the beams adding to the latency.

Downlink SINR and Channel Quality Prediction

Typically, a base-station receives reports from a user device on the quality of its received downlink channel. In LTE/5G, these reports are known as CQI (Channel Quality Indicator) reports, which can be scheduled periodically or on-demand and consist of quantized channel quality information for the entire band (wide-band), or for multiple sub-bands. A channel quality metric may be computed by averaging the received channel power across a specific band.

Let's denote the vector, $V_{t_i} = [Q_1, Q_2, \ldots, Q_N]^T$ as a vector of $N \geq 1$ channel quality measurements, $Q_j$, $j=1, 2, \ldots, N$, for a time instance $t_i$, where the index j represents different sub-bands. Note, that $Q_j$ may represent SINR, average SINR, CQI or any other value, which is proportional to the channel's received power.

A remote base-station in the cloud may apply a prediction filter, C, to these measurements and compute a future quality measurements vector $V_{t_i + \Delta t}$, that represents a prediction of these values in a future time denoted by $t_i + \Delta t$, where $\Delta t > 0$. The prediction filter may be represented by an N×N matrix and the predicted values are then computed as $$V_{t_i + \Delta t} = C \cdot V_{t_i} \qquad (1)$$

The following section explains how to compute this filter matrix. With future knowledge on the quality of the channel, the C-RAN can overcome the latency and make better decisions on future scheduling and thus improve the overall cell capacity.

Examples of Prediction Filter Estimation

The prediction filter may be computed after a short training that consists of receiving one or more pairs of channel quality measurement vectors, separated by the desired latency Δt. Let K≥1, be the number of training pairs. Then, the base-station may collect these training pairs in two matrices:

$$\Theta_1 = [V_{t_1} | V_{t_2} | \ldots | V_{t_K}] \quad (2)$$

$$\Theta_2 = [V_{t_1+\Delta t} | V_{t_2+\Delta t} | \ldots | V_{t_K+\Delta t}] \quad (3)$$

and combine them into a single matrix:

$$\Theta = \begin{bmatrix} \Theta_1 \\ \Theta_2 \end{bmatrix} \quad (4)$$

Let, R, be the maximum likelihood cross-covariance matrix, of dimensions 2N×2N, that maximizes the probability $$P(\Theta|R) = \frac{1}{\sqrt{(2\pi)^{2N}|R|}} \cdot e^{-\frac{1}{2}\Theta^H R^{-1} \Theta} \quad (5)$$

Note, that R is composed of 4 different N×N Toeplitz sub-matrices $$R = \begin{bmatrix} R_{11} & R_{12} \\ R_{21} & R_{22} \end{bmatrix} \quad (6)$$

The prediction filter may be computed from these sub-matrices as $$C = R_{21} \cdot R_{11}^{-1} \quad (7)$$

The prediction filter may be used for predicting future channel quality of a same or a different channel as described herein.

Uplink SINR and Channel Quality Prediction

The base-station may apply similar techniques to predict the channel quality in the uplink as well and make decisions on future uplink scheduling, in the presence of latency. The base-station may use uplink reference signals to compute the uplink received channel power and then, process it similarly to the downlink.

Various embodiments of C-RAN equipment and methods are described below as a listing of technical solutions. These solutions will enable deployment of C-RAN architecture and network-side functions in a distributed manner. These solutions will also enable economies of implementation due to the ability to be able to perform highly accurate estimation of future behavior of channel. These solutions will therefore allow network operators and network equipment manufacturers to trade off amount of computational resources that need to be deployed at various locations around a wireless network. For example, equipment with slower or fewer computational resources may be deployed locally, while greater computational resources may be deployed at a remote site.

The following listing of solutions may be preferably implemented by various embodiments.

Figure 5:
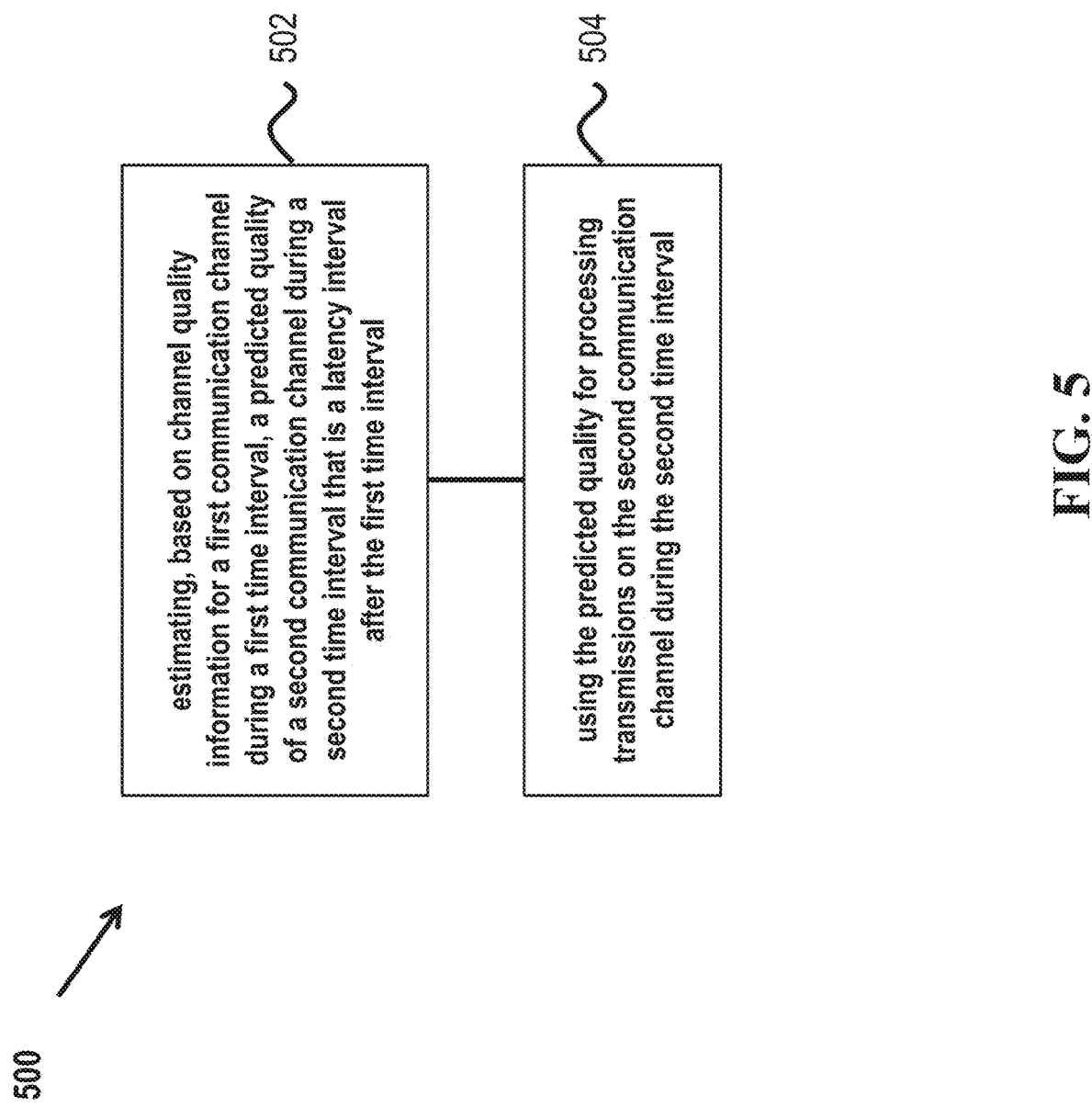
FIG. 5 is a flowchart for an example method of wireless communication.

1. A wireless communication method (e.g., method 500 described in FIG. 5) may be implemented as follows. The method 500 may be implemented by a network-side device or in a distributed manner as depicted in FIG. 1A. The method 500 may include, at 502, estimating, based on channel quality information for a first communication channel during a first time interval, a predicted quality of a second communication channel during a second time interval that is a latency interval after the first time interval.

For example, the first time interval may represent the time during which a reference signal transmission occurs between a network-side device and a user device. For example, the first time interval may be the TTI or a subframe during which the reference signal is transmitted.

The method 500 may include, at 504, using the predicted quality for processing transmissions on the second communication channel during the second time interval.

The second time interval may be a future TTI or subframe during which a next transmission occurs using the predicted quality of channel. For example, modulation and coding scheme or a pre-coding matrix used for the future transmission may be based on the predicted channel quality.

2. The method of solution 1, wherein the first communication channel comprises N subbands, where N is a positive integer, and wherein the channel quality information is represented as a vector having N×1 dimension wherein entries of the vector correspond to channel qualities of the N subbands.

For communication systems that use orthogonal frequency division multiplexing (OFDM) modulation, each subband may correspond to a subcarrier of the OFDM system. In some embodiments, each subband may correspond to a bandwidth part (BWP) which represents a contiguous frequency domain (spectrum) resource, e.g., as defined in 5G.

3. The method of solution 1-2, wherein the estimating the predicted quality includes: determining a prediction filter for estimating the predicted quality and estimating the predicted quality by applying the prediction filter to the channel quality information.

4. The method of solution 3, wherein the determining the prediction filter includes: generating one or more pairs of channel quality information vectors representing channel quality measurements for the first communication channel and/or the second communication channel using a training step; determining a maximum likelihood cross-covariance matrix for a matrix whose entries correspond to the one or more pairs of channel quality information vectors; and determining the prediction filter from the maximum likelihood cross-covariance matrix.

5. The method of solution 4, wherein the one or more pairs of channel quality information vectors are represented as:

$$\Theta_1 = [V_{t_1} | V_{t_2} | \ldots | V_{t_K}]$$

$$\Theta_2 = [V_{t_1+\Delta t} | V_{t_2+\Delta t} | \ldots | V_{t_K+\Delta t}]$$

where $V_x$ represents an N×1 vector of channel quality measurements at time x, and wherein Δt corresponds to the latency interval; and wherein the matrix is represented as:

$$\Theta = \begin{bmatrix} \Theta_1 \\ \Theta_2 \end{bmatrix}$$

and wherein the maximum likelihood cross-covariance matrix is determined by maximizing a probability:

$$P(\Theta|R) = \frac{1}{\sqrt{(2\pi)^{2N}|R|}} \cdot e^{-\frac{1}{2}\Theta^H R^{-1} \Theta}$$

Where R is the maximum likelihood cross-covariance matrix represented as $$R = \begin{bmatrix} R_{11} & R_{12} \\ R_{21} & R_{22} \end{bmatrix};$$

wherein the prediction filter C corresponds to:

$$C = R_{21} \cdot R_{11}^{-1}.$$

6. The method of solution 5, wherein $R_{11}$, $R_{12}$, $R_{21}$ and $R_{22}$ are Toeplitz matrices.

7. The method of any of solutions 1-6, wherein the second communication channel is in a reverse direction of the first communication channel.

8. The method of any of solutions 3-7, wherein the estimating the predicted quality is performed at a first network function that receives transmissions on the first communication channel, and wherein the determining the prediction filter is performed by a second network function that is remote from the first network function.

9. The method of any of solutions 3-7, wherein the estimating the predicted quality and the determining the prediction filter is performed at a second network function that is remote from a first network function that receives transmissions on the first communication channel.

10. The method of any of solutions 1-9, wherein the first communication channel is same as the second communication channel.

11. The method of any of solutions 1-9, wherein the first communication channel is an uplink communication channel and the second communication channel is a downlink communication channel.

12. The method of any of solutions 1-11, wherein the processing transmissions on the second communication channel comprises scheduling transmissions on the second communication channel.

13. The method of solution 12, wherein the scheduling transmissions includes selecting, from one or more subbands of the second communication channel, subbands used for the transmissions and corresponding modulation and coding rate selection for the subbands used for the transmissions.

14. The method of any of solutions 1-11, wherein the processing transmissions on the second communication channel comprises performing transmissions on the second communication channel.

15. The method of any of solutions 1-14, wherein the channel quality information includes signal to interference plus noise ratio (SINR), an average SINR, CQI or a value proportional to received transmission power.

16. The method of any of solutions 1-13, wherein the channel quality information includes CQI reporting as defined in 3GPP LTE or 5G standards.

17. The method of any of solutions 1-16, wherein the channel quality information is derived from reception of reference signal transmissions.

18. The method of any of solutions 3-17, wherein the estimating the predicted quality of the second communication channel is performed repeatedly and the determining the prediction filter is performed repeatedly at a slower periodicity than that of the estimating the predicted quality of the second communication channel.

19. The method of any of solutions 1 to 18, wherein the first communication channel and the second communication channel are frequency division duplexed (FDD) channels.

20. The method of any of solutions 1 to 18, wherein the first communication channel and the second communication channel are time division duplexed (TDD) channels at occupying same frequencies.

Figure 8:
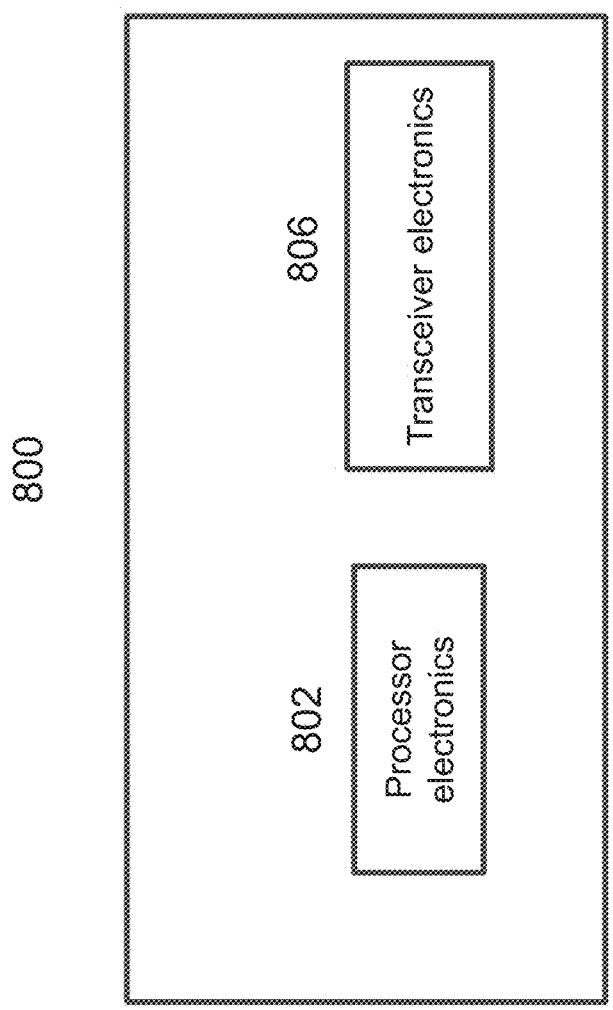
FIG. 8 shows an example of a wireless transceiver apparatus.

21. A wireless communication apparatus comprising processor electronics and transceiver electronics, wherein the transceiver electronics is configured to receive channel quality information for a first communication channel during a first time interval; and wherein the processor electronics is configured to estimate a predicted quality of a second communication channel during a second time interval that is a latency time interval after the first time interval and using the predicted quality for processing transmissions on the second communication channel during the second time interval. FIG. 8 shows an example of an apparatus used for implementing this solution.

22. The apparatus of solution 21, wherein the first communication channel comprises N subbands, where N is a positive integer, and wherein the channel quality information is represented as a vector having N×1 dimension wherein entries of the vector correspond to channel qualities of the N subbands.

23. The apparatus of solution 21-22, wherein the estimating the predicted quality includes: determining a prediction filter for estimating the predicted quality, and estimating the predicted quality by applying the prediction filter to the channel quality information.

24. The apparatus of solution 23, wherein the determining the prediction filter includes: generating one or more pairs of channel quality information vectors representing channel quality measurements for the first communication channel and/or the second communication channel using a training step; determining a maximum likelihood cross-covariance matrix for a matrix whose entries correspond to the one or more pairs of channel quality information vectors; and determining the prediction filter from the maximum likelihood cross-covariance matrix.

25. The apparatus of solution 24, wherein the one or more pairs of channel quality information vectors are represented as:

$$\Theta_1 = [V_{t_1} | V_{t_2} | \ldots | V_{t_K}]$$

$$\Theta_2 = [V_{t_1 + \Delta t} | V_{t_2 + \Delta t} | \ldots | V_{t_K + \Delta t}]$$

where $V_x$ represents an N×1 vector of channel quality measurements at time x, and wherein Δt corresponds to the latency interval; and wherein the matrix is represented as:

$$\Theta = \begin{bmatrix} \Theta_1 \\ \Theta_2 \end{bmatrix}$$

and wherein the maximum likelihood cross-covariance matrix is determined by maximizing a probability:

$$P(\Theta | R) = \frac{1}{\sqrt{(2\pi)^{2N} |R|}} \cdot e^{-\frac{1}{2} \Theta^H R^{-1} \Theta}$$

Where R is the maximum likelihood cross-covariance matrix represented as $$R = \begin{bmatrix} R_{11} & R_{12} \\ R_{21} & R_{22} \end{bmatrix};$$

wherein the prediction filter C corresponds to:

$$C = R_{21} \cdot R_{11}^{-1}.$$

26. The apparatus of solution 25, wherein $R_{11}$, $R_{12}$, $R_{21}$ and $R_{22}$ are Toeplitz matrices.

27. The apparatus of any of solutions 21-26, wherein the second communication channel is in a reverse direction of the first communication channel.

28. The apparatus of any of solutions 23-27, wherein the estimating the predicted quality is performed by the apparatus and wherein the determining the prediction filter is performed by an apparatus that is in communication with the apparatus.

29. The apparatus of any of solutions 23-27, wherein the estimating the predicted quality and the determining the prediction filter is performed at a remotely located apparatus and wherein the apparatus receives a result of the estimating the predicted quality from the remotely located apparatus.

30. The apparatus of any of solutions 21-29, wherein the first communication channel is same as the second communication channel.

31. The apparatus of any of solutions 21-29, wherein the first communication channel is an uplink communication channel and the second communication channel is a downlink communication channel.

32. The apparatus of any of solutions 21-31, wherein the processing transmissions on the second communication channel comprises scheduling transmissions on the second communication channel.

33. The apparatus of solution 32, wherein the scheduling transmissions includes selecting, from one or more subbands of the second communication channels, subbands used for the transmissions and corresponding modulation and coding rate selection for the subbands used for the transmissions.

34. The apparatus of any of solutions 21-31, wherein the processing transmissions on the second communication channel comprises performing transmissions on the second communication channel.

35. The apparatus of any of solutions 21-34, wherein the channel quality information includes signal to interference plus noise ratio (SINR), an average SINR, CQI or a value proportional to received transmission power.

36. The apparatus of any of solutions 21-33, wherein the channel quality information includes CQI reporting as defined in 3GPP LTE or 5G standards.

37. The apparatus of any of solutions 21-36, wherein the channel quality information is derived from reception of reference signal transmissions.

38. The apparatus of any of solutions 23-37, wherein the estimating the predicted quality of the second communication channel is performed repeatedly and the determining the prediction filter is performed repeatedly at a slower periodicity than that of the estimating the predicted quality of the second communication channel.

39. The apparatus of any of solutions 21 to 38, wherein the first communication channel and the second communication channel are frequency division duplexed (FDD) channels.

40. The apparatus of any of solutions 1 to 18, wherein the first communication channel and the second communication channel are time division duplexed (TDD) channels at occupying same frequencies.

Figure 6:
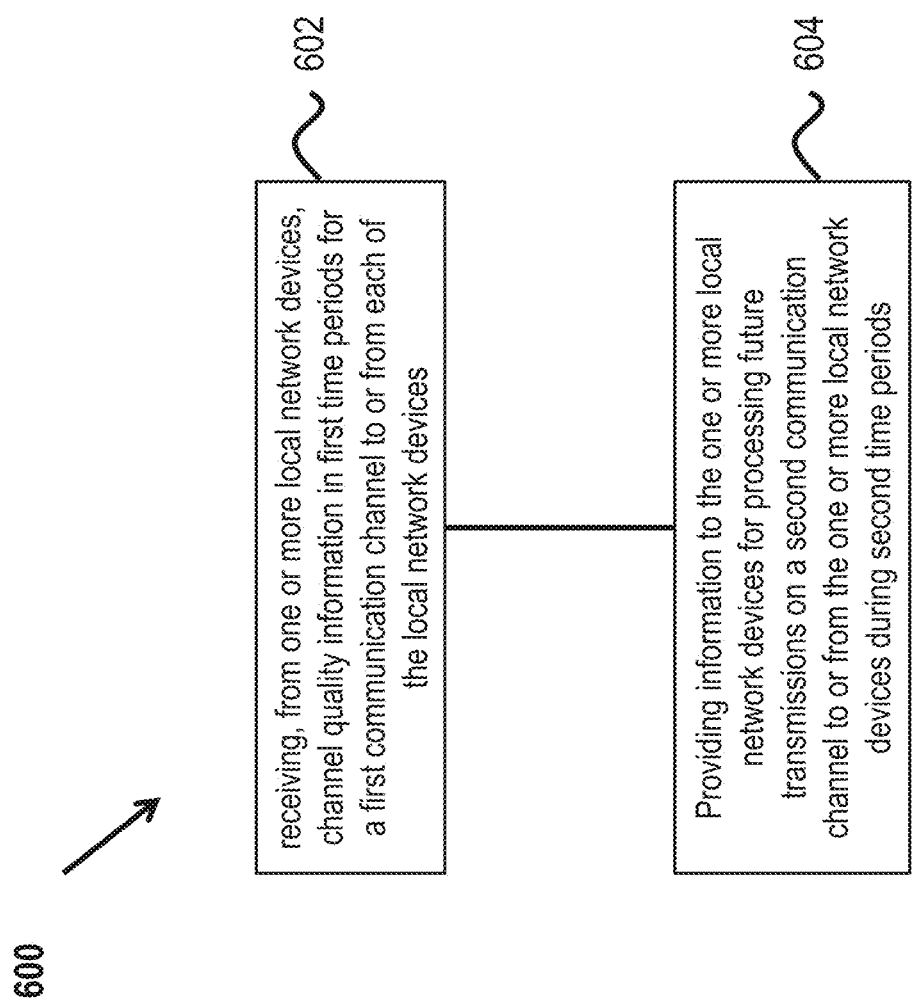
FIG. 6 is a flowchart for an example method of wireless communication.

41. A method implemented by a remote network device (for example, method 600 shown in FIG. 6), comprising: receiving (602), from one or more local network devices, channel quality information in first time periods for a first communication channel to or from each of the local network devices; and providing (604) information to the one or more local network devices for processing future transmissions on a second communication channel to or from the one or more local network devices during second time periods, wherein the first time periods and the second time periods are separated by latency periods between corresponding local network devices and the remote network device. The first time period and the second time period may be as explained with respect to FIG. 5.

42. The method of solution 41, wherein an ith first communication channel comprises Ni subbands, where Ni is a positive integer, and wherein the channel quality information is represented as a vector having Ni×1 dimension wherein entries of the vector correspond to channel qualities of the Ni subbands, wherein i=1, . . . M, where M is a number of the one or more local network devices serviced by the remote network device.

43. The method of any of solutions 41-42, wherein the information for processing future transmissions for a $j^{th}$ communication node includes an estimate of a predicted quality of a second communication channel for the $j^{th}$ local communication node at the future time.

44. The method of any of solutions 41-42, wherein the information for processing future transmissions for a $j^{th}$ communication node includes a prediction filter used for predicting a quality of a second communication channel for the $j^{th}$ communication node at the future time.

45. The method of solution 44, wherein the predicted quality is estimated by: estimating the predicted quality by applying the prediction filter to the channel quality information.

46. The method of solution 44, wherein the determining the prediction filter includes: generating one or more pairs of channel quality information vectors representing channel quality measurements for the first communication channel and/or the second communication channel using a training step; determining a maximum likelihood cross-covariance matrix for a matrix whose entries correspond to the one or more pairs of channel quality information vectors; and determining the prediction filter from the maximum likelihood cross-covariance matrix.

47. The method of solution 46, wherein the one or more pairs of channel quality information vectors are represented as:

$$\Theta_1 = [V_{t_1} | V_{t_2} | \ldots | V_{t_K}]$$

$$\Theta_2 = [V_{t_1 + \Delta t} | V_{t_2 + \Delta t} | \ldots | V_{t_K + \Delta t}]$$

where $V_x$ represents an N×1 vector of channel quality measurements at time x, and wherein $\Delta t$ corresponds to the latency interval; and wherein the matrix is represented as:

$$\Theta = \begin{bmatrix} \Theta_1 \\ \Theta_2 \end{bmatrix}$$

and wherein the maximum likelihood cross-covariance matrix is determined by maximizing a probability:

$$P(\Theta | R) = \frac{1}{\sqrt{(2\pi)^{2N} |R|}} \cdot e^{-\frac{1}{2} \Theta^H R^{-1} \Theta}$$

Where R is the maximum likelihood cross-covariance matrix represented as $$R = \begin{bmatrix} R_{11} & R_{12} \\ R_{21} & R_{22} \end{bmatrix};$$

wherein the prediction filter C corresponds to:

$$C = R_{21} \cdot R_{11}^{-1}.$$

48. The method of solution 47, wherein $R_{11}$, $R_{12}$, $R_{21}$ and $R_{22}$ are Toeplitz matrices.

49. The method of any of solutions 41-48, wherein the second communication channel is in a reverse direction of the first communication channel.

50. The method of any of solutions 41-49, wherein the first communication channels are same as the second communication channels.

51. The method of any of solutions 41-49, wherein the first communication channels are uplink communication channels and the second communication channels are downlink communication channels.

52. The method of any of solutions 41-51, wherein the processing transmissions on the second communication channel comprises scheduling transmissions on the second communication channel.

53. The method of any of solutions 41-52, wherein the channel quality information includes signal to interference plus noise ratio (SINR), an average SINR, CQI or a value proportional to received transmission power.

54. The method of any of solutions 41-52, wherein the channel quality information includes CQI reporting as defined in 3GPP LTE or 5G standards.

55. The method of any of solutions 41-54, wherein the channel quality information is derived from reception of reference signal transmissions.

56. The method of any of solutions 41-55, wherein the first communication channels and the second communication channels are frequency division duplexed (FDD) channels.

57. The method of any of solutions 41 to 56, wherein the first communication channels and the second communication channels are time division duplexed (TDD) channels at occupying same frequencies.

58. A wireless communication apparatus comprising a processor configured to implement a method recited in any of solutions 41 to 57.

In the above-described solutions, the second communication channel may also comprise multiple subbands (N or another integer number of subbands). For example, in some deployments, the first and the second communication channel maybe TDD channels and may use same subband structure for communication. In some deployments, the first and the second communication channels may be FDD and may use different frequencies and different channel arrangements (e.g., different number of subbands with different bandwidths). As such, the techniques disclosed herein (e.g., equations 1 to 7) do not depend on a specific structure of a communication channel (e.g., number of subbands or their bandwidths), and thus enables C-RAN deployments in which channel utilization can be flexible and may be changed from time to time.

In the described solutions, e.g., with respect to Equations (1) to (7), the cross-covariance matrix may be computed by posing the problems as a problem of maximizing conditional probability of a multivariable expression. For example, the matrix R, may be calculated as a matrix that maximizes conditional probability of a multivariate distribution with zero mean. (e.g., Equation 5), Using the channel quality information, the matrix may be determined using a numerical computation process to maximize the probability that represents equation for a conditional probability of a multivariate normal distribution with zero mean. For example, the probability of getting $\Theta$ given a covariance matrix R, will be evaluated during the prediction filter evaluation. Here the elements of the predicted (and received) channel quality information $\Theta$ may be assumed to have a normal distribution and zero mean.

In other embodiments, the optimization problem for computing an optimal matrix R may be posed as different optimization problems under different assumptions (e.g., a different model for probability of distribution, or a different mean) and the optimal matrix may be evaluated accordingly.

Figure 7:
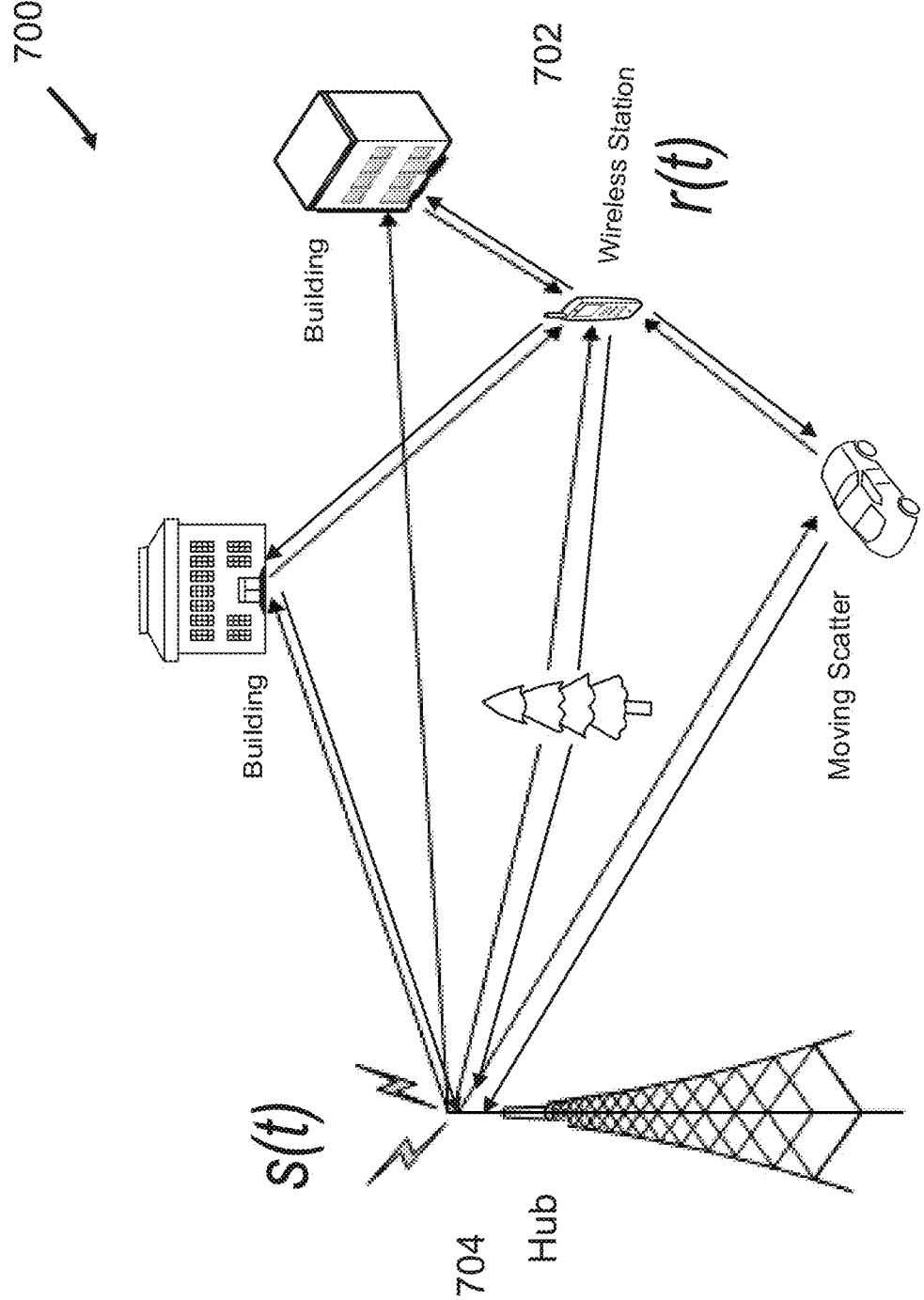
FIG. 7 shows an example communication network.

FIG. 7 show an example of a wireless network 700 in which a wireless link is shown between a mobile wireless station 702 and a hub 704 that may be a backhaul hub. The link may experience various paths that are reflected by reflectors such as buildings, trees or moving scatterers such as vehicles. The presently disclosed techniques may be used to provide wireless connectivity between multiple wireless stations 702 and the hub 704. The channel estimation and scheduling functions of the hub 704 using the local and remote parts, such as described in this document (e.g., FIG. 1A). For example, one or more mobile wireless stations 702 may perform channel quality measurements on a downlink channel from the hub 704 to the mobile wireless station 704

FIG. 8 depicts an example of a wireless communication apparatus 800 that may be used to implement the methods and techniques described in the present document and attachments. The apparatus 800 includes a processor electronics 802 and transceiver electronics 806. The processor 802 may be programmed to implement some of the disclosed techniques. The transceiver circuitry 806 may be used to implement the transmission or reception functions described herein. The apparatus 800 may be used to implement functionalities described with respect to the mobile wireless station or base station or a local part or a remote part of the base station. The processor electronics 802 may correspond to a single processor or multiple processors that may be distributed across multiple computing platforms.

In some embodiments, a system for wireless communication may include one or more first apparatus that implements a local part of a base station functionality, and a second apparatus that implements a remote part of the base station functionality. The system may further include user devices, wireless communication apparatus as described in the present document. The system may thus represent a cooperatively operating group of base stations, deployed at different locations throughout a geographic area, with one (or more) of the locations also performing the remote base station functionality (e.g., calculation of prediction filters or estimation of future channel qualities), as described in the present document.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

The invention claimed is:

1. A wireless communication method, comprising:
estimating, based on channel quality information for a first communication channel during a first time interval, a predicted quality of a second communication channel during a second time interval that is a latency interval after the first time interval,
wherein the estimating includes 1) determining a prediction filter for estimating the predicted quality, and 2) estimating the predicted quality by applying the prediction filter to the channel quality information,
wherein the determining the prediction filter includes: 1) generating one or more pairs of channel quality information vectors representing channel quality measurements for the first communication channel and/or the second communication channel using a training step; 2) determining a maximum likelihood cross-covariance matrix for a matrix whose entries correspond to the one or more pairs of channel quality information vectors; and 3) determining the prediction filter from the maximum likelihood cross-covariance matrix,
wherein the one or more pairs of channel quality information vectors are represented as: $\Theta_1=[V_{t_1}|V_{t_2}| \ldots | V_{t_K}]$, $\Theta_2=[V_{t_1+\Delta t}|V_{t_2+\Delta t}| \ldots | V_{t_K+\Delta t}]$, where $V_x$ represents an N×1 vector of channel quality measurements at time x, and wherein $\Delta t$ corresponds to the latency interval; and wherein the matrix is represented as:

$$\Theta = \begin{bmatrix} \Theta_1 \\ \Theta_2 \end{bmatrix}$$

and wherein the maximum likelihood cross-covariance matrix is determined by maximizing a probability:

$$P(\Theta | R) = \frac{1}{\sqrt{(2\pi)^{2N}|R|}} \cdot e^{-\frac{1}{2}\Theta^H R^{-1}\Theta}$$

where R is the maximum likelihood cross-covariance matrix represented as R=

$$R = \begin{bmatrix} R_{11} & R_{12} \\ R_{21} & R_{22} \end{bmatrix};$$

wherein the prediction filter C corresponds to: $C=R_{21} \cdot R_{11}^{-1}$, wherein $R_{11}$, $R_{12}$, $R_{21}$ and $R_{22}$ are Toeplitz matrices; and using the predicted quality for processing transmissions on the second communication channel during the second time interval, wherein the second communication channel is in a reverse direction of the first communication channel.

2. The method of claim 1, wherein the first communication channel comprises N subbands, where N is a positive integer, and wherein the channel quality information is represented as a vector having N×1 dimension wherein entries of the vector correspond to channel qualities of the N subbands.

3. The method of claim 1, wherein the estimating the predicted quality is performed at a first network function that receives transmissions on the first communication channel, and wherein the determining the prediction filter is performed by a second network function that is remote from the first network function.

4. The method of claim 1, wherein the estimating the predicted quality and the determining the prediction filter is performed at a second network function that is remote from a first network function that receives transmissions on the first communication channel.

5. The method of claim 1, wherein the first communication channel is same as the second communication channel.

6. The method of claim 1, wherein the first communication channel is an uplink communication channel and the second communication channel is a downlink communication channel.

7. The method of claim 1, wherein the processing transmissions on the second communication channel comprises scheduling transmissions on the second communication channel.

8. The method of claim 7, wherein the scheduling transmissions includes selecting, from one or more subbands of the second communication channel, subbands used for the transmissions and corresponding modulation and coding rate selection for the subbands used for the transmissions.

9. The method of claim 1, wherein the processing transmissions on the second communication channel comprises performing transmissions on the second communication channel.

10. The method of claim 1, wherein the channel quality information includes signal to interference plus noise ratio (SINR), an average SINR, CQI or a value proportional to received transmission power.

11. The method of claim 1, wherein the channel quality information includes CQI reporting as defined in 3GPP LTE or 5G standards.

12. The method of claim 1, wherein the channel quality information is derived from reception of reference signal transmissions.

13. The method of claim 1, wherein the estimating the predicted quality of the second communication channel is performed repeatedly and the determining the prediction filter is performed repeatedly at a slower periodicity than that of the estimating the predicted quality of the second communication channel.

14. The method of claim 1, wherein the first communication channel and the second communication channel are frequency division duplexed (FDD) channels.

15. The method of claim 1, wherein the first communication channel and the second communication channel are time division duplexed (TDD) channels at occupying same frequencies.

16. A wireless communication apparatus comprising processor electronics and transceiver electronics,
wherein the transceiver electronics is configured to receive channel quality information for a first communication channel during a first time interval; and
wherein the processor electronics is configured to estimate a predicted quality of a second communication channel during a second time interval that is a latency time interval after the first time interval and using the predicted quality for processing transmissions on the second communication channel during the second time interval,
wherein the estimating includes 1) determining a prediction filter for estimating the predicted quality, and 2) estimating the predicted quality by applying the prediction filter to the channel quality information,
wherein determining the prediction filter includes: 1) generating one or more pairs of channel quality information vectors representing channel quality measurements for the first communication channel and/or the second communication channel using a training step; 2) determining a maximum likelihood cross-covariance matrix for a matrix whose entries correspond to the one or more pairs of channel quality information vectors; and 3) determining the prediction filter from the maximum likelihood cross-covariance matrix,
wherein the one or more pairs of channel quality information vectors are represented as: $\Theta_1=[V_{t_1}|V_{t_2}| \ldots |V_{t_K}]$, $\Theta_2=[V_{t_1+\Delta t}|V_{t_2+\Delta t}| \ldots |V_{t_K+\Delta t}]$, where $V_x$ represents an N×1 vector of channel quality measurements at time x, and wherein $\Delta t$ corresponds to the latency interval; and wherein the matrix is represented as:

$$\Theta = \begin{bmatrix} \Theta_1 \\ \Theta_2 \end{bmatrix}$$

and wherein the maximum likelihood cross-covariance matrix is determined by maximizing a probability:

$$P(\Theta \mid R) = \frac{1}{\sqrt{(2\pi)^{2N}|R|}} \cdot e^{-\frac{1}{2}\Theta^H R^{-1}\Theta}$$

where R is the maximum likelihood cross-covariance matrix represented as R=

$$R = \begin{bmatrix} R_{11} & R_{12} \\ R_{21} & R_{22} \end{bmatrix};$$

wherein the prediction filter C corresponds to: $C=R_{21} \cdot R_{11}^{-1}$, wherein $R_{11}$, $R_{12}$, $R_{21}$ and $R_{22}$ are Toeplitz matrices, wherein the second communication channel is in a reverse direction of the first communication channel.

17. The apparatus of claim 16, wherein the first communication channel comprises N subbands, where N is a positive integer, and wherein the channel quality information is represented as a vector having N×1 dimension wherein entries of the vector correspond to channel qualities of the N subbands.

18. The apparatus of claim 16, wherein the estimating the predicted quality is performed by the apparatus and wherein the determining the prediction filter is performed by an apparatus that is in communication with the apparatus.

19. The apparatus of claim 16, wherein the estimating the predicted quality and the determining the prediction filter is performed at a remotely located apparatus and wherein the apparatus receives a result of the estimating the predicted quality from the remotely located apparatus.

20. The apparatus of claim 16, wherein the first communication channel is same as the second communication channel.

* * * * *